United States Patent
Zhou et al.

(10) Patent No.: US 10,009,929 B1
(45) Date of Patent: Jun. 26, 2018

(54) CONTENTION-BASED RANDOM ACCESS

(71) Applicant: Sprint Spectrum LP, Overland Park, KS (US)

(72) Inventors: Yu Zhou, Herndon, VA (US); Muhammad Ahsan Naim, Ashburn, VA (US); Luca Zappaterra, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 126 days.

(21) Appl. No.: 15/079,312

(22) Filed: Mar. 24, 2016

(51) Int. Cl.
*H04W 74/00* (2009.01)
*H04W 74/08* (2009.01)
*H04W 52/20* (2009.01)
*H04L 12/807* (2013.01)
*H04W 52/48* (2009.01)
*H04L 1/00* (2006.01)

(52) U.S. Cl.
CPC ....... *H04W 74/0833* (2013.01); *H04W 52/20* (2013.01); *H04L 1/0001* (2013.01); *H04L 47/27* (2013.01); *H04W 52/48* (2013.01)

(58) Field of Classification Search
CPC . H04W 74/08; H04W 74/0833; H04W 52/20; H04W 52/48; H04W 76/00; H04W 76/028; H04W 72/0413; H04W 72/042; H04W 72/0446; H04W 72/0833; H04W 88/02; H04L 1/0001; H04L 1/832187; H04L 47/27
See application file for complete search history.

(56) References Cited

U.S. PATENT DOCUMENTS

| | | | |
|---|---|---|---|
| 8,467,412 B2 | 6/2013 | Li et al. | |
| 8,682,318 B2 | 3/2014 | Lee et al. | |
| 9,860,850 B2 * | 1/2018 | Chen | H04W 52/146 |
| 9,900,851 B2 * | 2/2018 | Bergman | H04W 52/36 |
| 2007/0230600 A1 * | 10/2007 | Bertrand | H04J 13/00 375/260 |
| 2009/0011786 A1 * | 1/2009 | Lee | H04W 52/325 455/522 |
| 2009/0103501 A1 * | 4/2009 | Farrag | H04W 74/02 370/337 |
| 2013/0242730 A1 * | 9/2013 | Pelletier | H04W 28/0284 370/230 |
| 2013/0265866 A1 * | 10/2013 | Yi | H04W 74/0841 370/216 |
| 2013/0286958 A1 * | 10/2013 | Liang | H04W 74/0866 370/329 |
| 2015/0016268 A1 * | 1/2015 | Merlin | H04W 28/0268 370/236 |

(Continued)

*Primary Examiner* — Warner Wong (57) ABSTRACT

Retransmission parameters are determined for a wireless device based on a desired retransmission success rate, that is, a probability that subsequent random access requests transmitted from the wireless device re-initiating a contention-based random access procedure with an access node will reach the access node. The retransmission parameters are determined based on at least a quality of service associated with the wireless device, a distance of the wireless device from the access node, and a cell load of the access node. The retransmission parameters include a retransmission power and a retransmission backoff window size. A product of the power and backoff window is scaled such that it can be equated with a retransmission success rate.

17 Claims, 6 Drawing Sheets

(56) References Cited

U.S. PATENT DOCUMENTS

| | | | |
|---|---|---|---|
| 2015/0295838 A1* | 10/2015 | Liu | H04L 5/0007 |
| | | | 370/235 |
| 2016/0073431 A1* | 3/2016 | Park | H04W 72/1284 |
| | | | 370/329 |
| 2017/0231011 A1* | 8/2017 | Park | H04W 74/0841 |
| 2017/0265230 A1* | 9/2017 | Liu | H04W 72/0413 |
| 2018/0020365 A1* | 1/2018 | Xiong | H04W 24/02 |

* cited by examiner

CONTENTION-BASED RANDOM ACCESS

TECHNICAL BACKGROUND

A wireless device attempting to establish communication with a wireless communication network typically sends a request for a communication channel to an access node using a random access procedure. There are two types of random access procedures: contention-free and contention-based. A contention-free random access procedure is used when, for example, a wireless device is handed over from one access node to another access node. A contention-based random access procedure is used when, for example, a wireless device exits an idle mode and attempts to re-establish communication with an access node, a wireless device temporarily loses communication with an access node and attempts to re-establish communication, data is available to be transmitted from the wireless device to the access node, etc. In a contention-based random access procedure, a wireless device typically sends a channel request over a randomly selected random access channel (RACH) or physical random access channel (PRACH). The channel request can comprise a random access preamble. When a channel request is received from the wireless device at an access node, the access node can provide a positive indication that access is permitted in a random access response. There exist a limited number of contention-based preambles, and multiple wireless devices transmitting the same preamble may result in a "collision" due to interference between the two identical preambles. As a result, only one of the wireless devices receives a positive indication in the random access response, while the other wireless device needs to re-initiate the contention-based random access procedure.

OVERVIEW

Exemplary embodiments described herein include systems, methods, and processing nodes for contention-based random access. A method for contention-based random access includes determining a retransmission power and a backoff window for a retransmission of a connection request to an access node from at least one of two or more wireless devices, comparing a scaled product of the retransmission power and backoff window with a predefined retransmission success rate, and upon determining that the scaled product is not substantially equal to the predefined retransmission success rate, adjusting the retransmission power and backoff window prior to transmitting the retransmission power and backoff window to the at least one of said two or more wireless devices.

A system for contention-based random access includes an access node for providing network services to one or more wireless devices, and a processor communicatively coupled to the access node. The processor configures the access node to perform operations including obtaining a location and a quality of service (QoS) of a wireless device that lost a contention-based random access procedure and, based on the location, the QoS, and a cell load of the access node, determining a retransmission power and a backoff parameter for the wireless device. A scaled product of the retransmission power and the backoff parameter represents a success rate for a subsequent preamble transmitted by the wireless device. Upon determining that the scaled product meets a threshold success rate, the retransmission power and the backoff parameter are transmitted to the wireless device.

A processing node for contention-based random access includes a processor for enabling the processing to perform operations including determining a retransmission power and a backoff window for a preamble transmitted by a wireless device to an access node, scaling the backoff window based on a cell load of the access node, and comparing a product of the retransmission power and the scaled backoff window with a predefined threshold. The predefined threshold represents a probability of success of the preamble reaching the access node.

DETAILED DESCRIPTION

In embodiments disclosed herein, retransmission parameters are determined for and transmitted to a wireless device based on a desired retransmission success rate, or probability of success. The retransmission success rate reflects a probability that subsequent random access requests transmitted from the wireless device re-initiating a contention-based random access procedure with an access node will reach the access node. The retransmission parameters are determined based on at least a quality of service (QoS) associated with the wireless device, a distance of the wireless device from the access node, and a cell load of the access node. The QoS of the wireless device is used to determine the desired retransmission success rate. The retransmission parameters include a retransmission power level (or simply, "power") and a retransmission backoff window size (or simply, "backoff window"). The power is generally an increased power level used for the retransmission of the random access request, and the backoff window is a time period after which the wireless device re-initiates the retransmission. The power may be determined based on the distance of the wireless device from the access node, and the backoff window may be determined based on a congestion level or cell load of the random access channel deployed by the access node. Further, a product of the power and backoff window is scaled such that it can be equated with the retransmission success rate or probability of success. The parameters are adjusted to meet the desired retransmission success rate, while remaining below maximum constraints for the access node. These and additional operations are further described with respect to the embodiments depicted in FIGS. 1-5 below.

Figure 1:
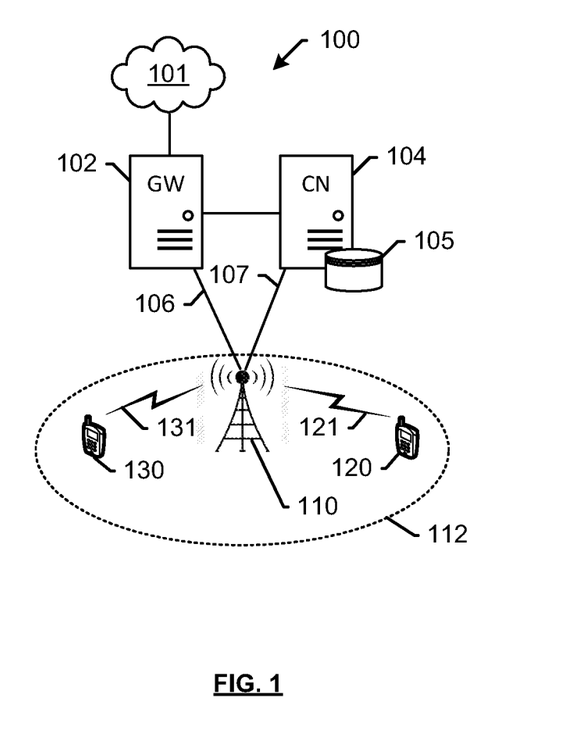
FIG. 1 depicts an exemplary system for contention-based random access.

FIG. 1 depicts an exemplary system 100 for contention-based random access. System 100 comprises a communication network 101, gateway 102, controller node 104, access node 110, and wireless devices 120, 130. Access node 110 is illustrated as having coverage area 112. Wireless devices 120, 130 are located within coverage area 112, and are in wireless communication with access node 110 via communication links 121, 131, respectively. In exemplary embodiments described herein, access node 110 determines a contention between identical random access preambles transmitted from each of wireless devices 120, 130, determines retransmission parameters for one of wireless devices 120, 130 that lost the contention, and transmits the retransmission parameters to said one of wireless devices 120, 130. The retransmission parameters are determined based on a distance of said one of wireless devices 120, 130 from access node 110, and a congestion of a random access channel deployed by access node 110, such as a physical random access channel (PRACH). Further, the retransmission parameters are adjusted such that a scaled product of the retransmission parameters satisfies a desired minimum retransmission success rate based on a QoS of said one of wireless devices 120, 130. For example, a connection requiring a high QoS, such as a voice call, may be assigned higher power and/or larger backoff window parameters, which are bounded by its packet delay budget defined by the QoS. The bounding condition is necessary because a longer backoff window size causes larger latency as well which may violate the packet delay budget defined by the QoS assigned to said one of wireless devices 120. Increasing the backoff window size works only if the maximum backoff windows is still bounded by the packet delay budget. Consequently, the scaled product of the parameters is larger, thereby increasing the probability of success of subsequent connection requests. In other words, when said one of wireless devices 120, 130 re-initiates a contention-based random access procedure, it is more likely that the retransmitted preamble is heard by access node 110.

Wireless devices 120, 130 may be any device, system, combination of devices, or other such communication platform capable of communicating wirelessly with access node 110 using one or more frequency bands deployed by access node 110. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information such as relationships between QoS/priority classes and predefined retransmission success rates for each of wireless devices 120, 130. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between wireless devices 120, 130, and communication network 101. Access node 110 can be a standard access node and/or a short range, low power, small access node. A standard access node can be a macrocell access node such as a base transceiver station, a radio base station, an eNodeB device, or an enhanced eNodeB device, or the like. In an exemplary embodiment, a macrocell access node can have a coverage area 112 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Figure 2:
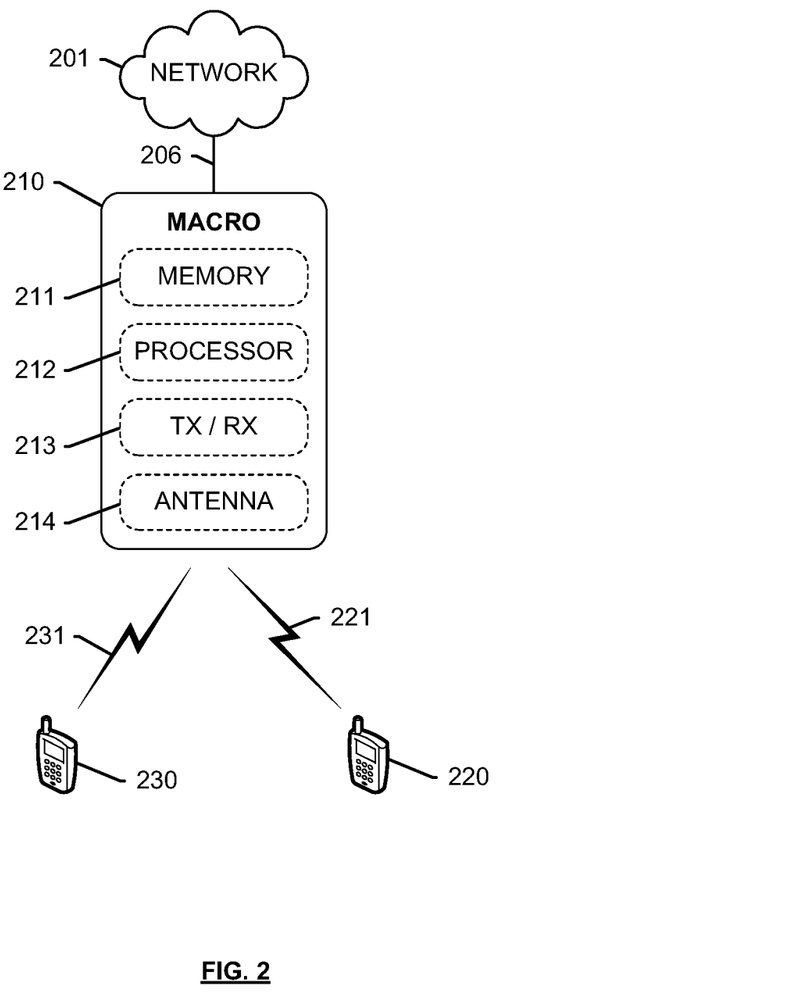
FIG. 2 depicts an exemplary access node for performing contention-based random access operations.

As depicted in further detail in FIG. 2, access node 110 can comprise a processor and associated circuitry to execute or direct the execution of computer-readable instructions to obtain information. Access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicates with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 3:
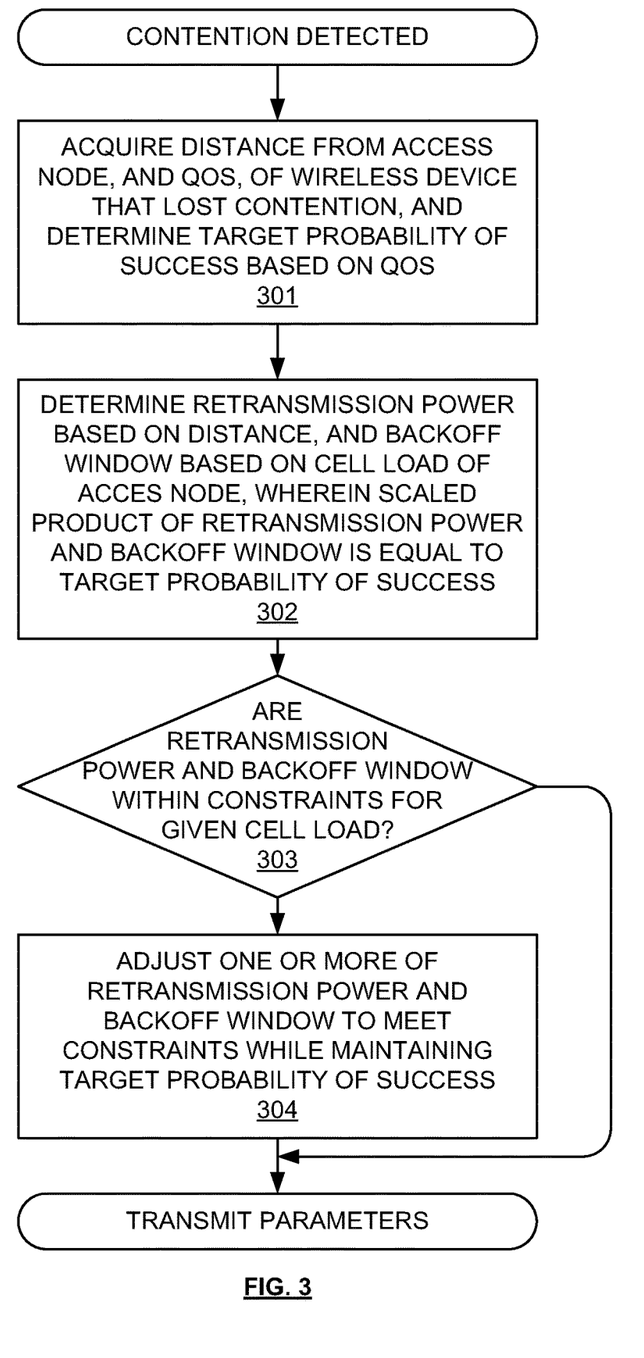
FIG. 3 depicts an exemplary method for contention-based random access.

FIG. 2 depicts an exemplary access node for performing contention-based random access operations. In this embodiment, access node 210 is a macro-cell access node (or "macro") as described above. In other embodiments, access node 210 can be any other type of access node including a small-cell access node, such as a relay node. In this embodiment, macro 210 is configured as an access point for providing network services from network 201 directly to end-user wireless devices 220, 230. Macro 210 is illustrated as comprising a memory 211 for storing logical modules including modules for performing operations described herein (for example, as shown in FIG. 3), a processor 212 for executing the logical modules, a transceiver 213, and an antenna 214 for communication with one or more wireless devices, including wireless devices 220, 230 via communication links 221, 231 respectively. Further, macro 210 is communicatively coupled to network 201 via communication interface 206, which may include additional components connected via any wired or wireless link as described above. For instance, there may be gateways and/or controllers in a path of communication interface 206. If access node 210 is a relay, then there may be additional access nodes in path 206. Moreover, although only one transceiver and antenna combination is depicted in access node 210, additional transceivers and antennas may be incorporated in order to deploy multiple frequency bands and to facilitate communication across other network nodes that are not shown, such as gateways, controllers, and other access nodes. In embodiments described herein, macro 210 deploys a random access channel or cell, such as a PRACH, whereby congestion of the channel is used as a factor among others in determining retransmission parameters for a wireless device that lost a contention.

FIG. 3 depicts an exemplary method for contention-based random access. The method is discussed with reference to the exemplary access node 210 illustrated in FIG. 2. However, the method can be implemented with any suitable network node. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

The method begins with a detection of a contention. For example, two wireless devices attempt to initiate a random access procedure to connect to the access node by transmitting the same preamble over the PRACH at the same time. In this case, the two preambles may interfere with each other and the access node receives neither preamble, such that neither wireless device receives any response (HARQ ACK) from the access node, and both wireless devices determine that the procedure has failed. Alternatively, the access node could successfully decode the preamble from only one wireless device, and fail to decode the preamble from the other wireless device, in which case the wireless device with the successful message will receive the HARQ ACK from the access node, i.e. a "contention resolution", whereas the other wireless device has "lost" the contention, and has to retransmit the preamble. Thus, the remaining operations are performed to determine optimal retransmission parameters for the wireless device that lost the contention.

At 301, a distance is obtained between said wireless device that lost the contention (hereinafter referred to as "the wireless device" for the purposes of this embodiment), and the access node. A QoS of the wireless device is obtained. A target probability of success is determined based on the QoS. The target probability of success or, in other words, a desired retransmission success rate, indicates a probability that subsequently transmitted random access requests will reach the access node. Moreover, the QoS may include a packet delay budget for the wireless device. Thus, the target probability of success is based on the packet delay budget. For example, different applications of the wireless device may have different packet delay budgets. An emergency call may have a low delay budget, thereby requiring a higher probability of success for subsequent retransmissions. Associations between different QoS levels and corresponding desired success rates may be stored on the access node, or on a separate node such as a controller node, which may be queried by the access node.

At 302, retransmission parameters including a retransmission power and a backoff window are determined based on the distance of the wireless device from the access node and on a cell load of the access node. For example, if the wireless device does not receive a random access response (RAR) after the previous preamble transmission, it is supposed to re-initiate the random access procedure. In other cases, the wireless device may receive a RAR from the access node, but the preamble index in the RAR is not intended for the wireless device, and may be intended for another wireless device, i.e. the wireless device that successfully transmitted the original preamble. In this case, a backoff indicator value (or "backoff window") is transmitted with the RAR to control the retransmission timing.

The retransmission power is a power level used for the retransmission of the random access request, usually measured in decibels (dB). The wireless device can retransmit the preamble with the same power level as the previous preamble, or may try using a higher power level. Thus, the retransmission power provides the wireless device with a maximum or incremental increase amount in the power level to be used for retransmission. For instance, the retransmission power can be provided to the wireless device (at the end of the method) in a powerRampingStep portion of a SIB2 message. Further, the retransmission power is determined based on the distance of the wireless device from the access node. For example, a first wireless device close to base station will transmit at lower power level as compared with a second wireless device at an edge of a coverage area, to ensure that the retransmitted preamble reaches the access node.

Figure 4A:
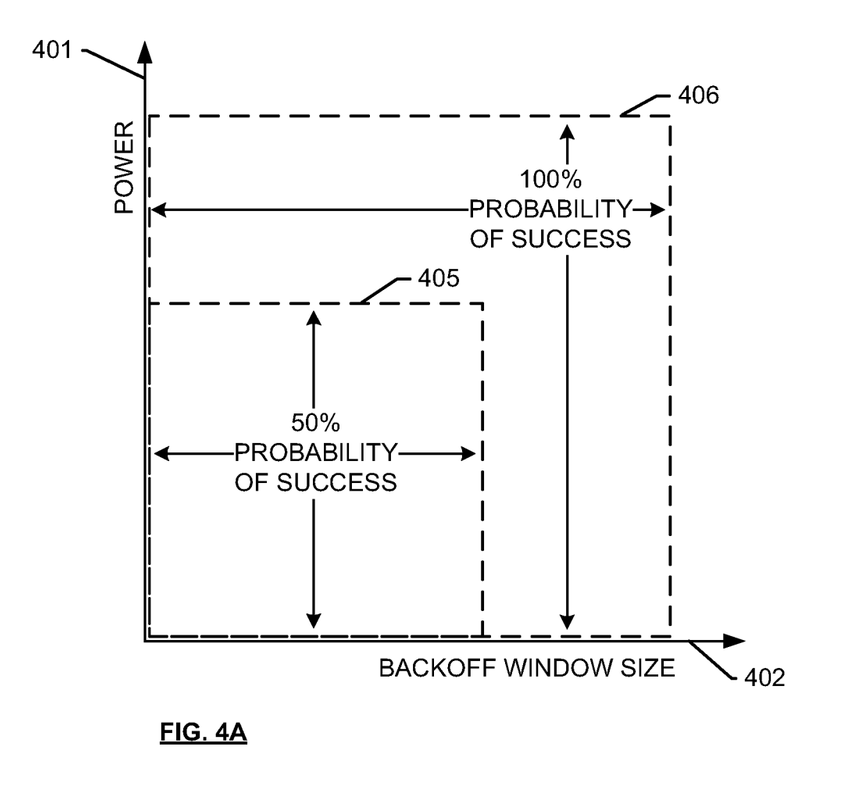
FIGS. 4A-4C depict graphs of exemplary retransmission parameters for a contention-based random access request.
Figure 4B:
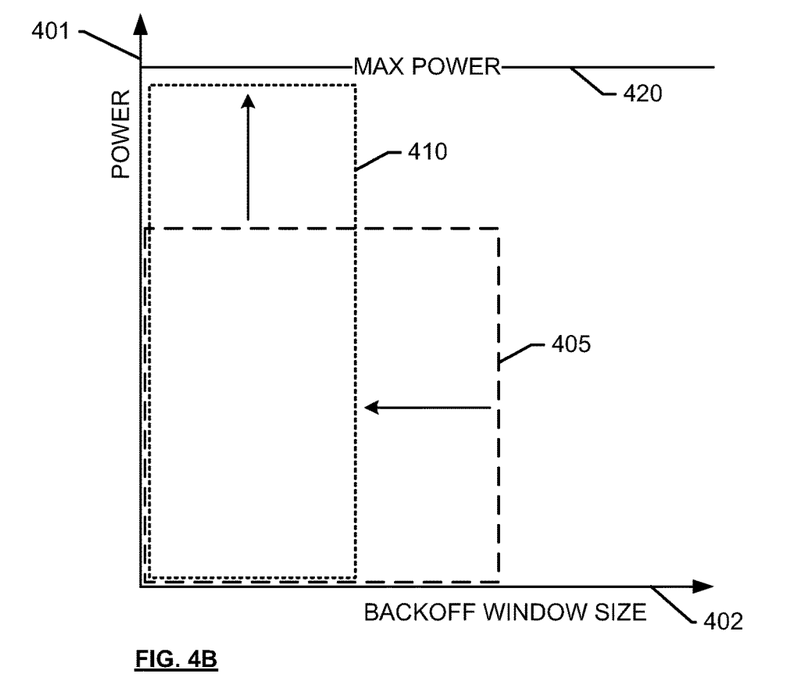
Figure 4C:
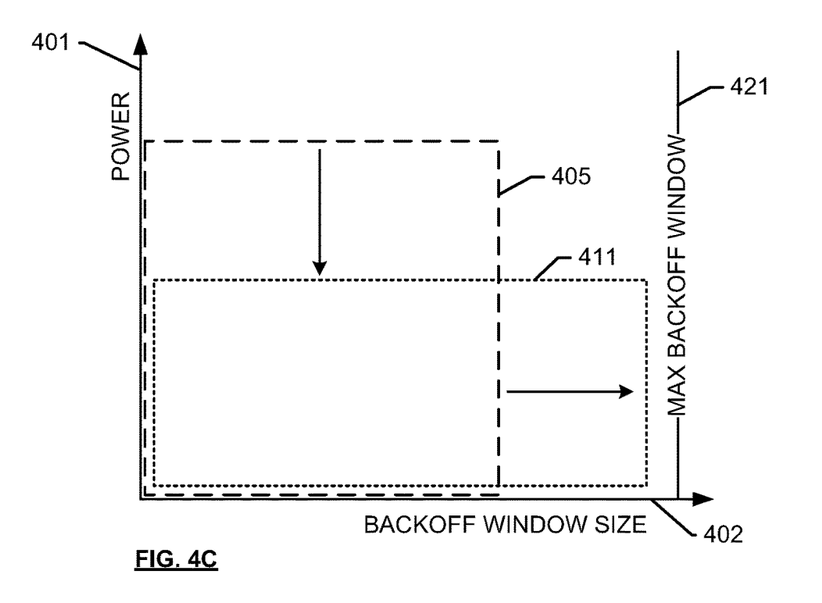

The retransmission backoff window size (or "backoff window") is a time period after which the wireless device re-initiates the retransmission. In other words, the backoff window indicates a time delay between the previous transmission and the next transmission. In some embodiments, the backoff window is provided as a backoff indicator (BI) parameter within a special MAC subheader. In this case, the BI parameter comprises 4 bits, carrying a value from 0-15, with each value being mapped to a specific time window. For more details please refer to 3GPP technical specification 36.321. Further, the backoff window may be determined based on a congestion level or cell load of the random access channel (e.g. PRACH) deployed by the access node. For instance, if the PRACH is heavily loaded, then a high backoff window is required to avoid additional preamble collisions. If the PRACH is lightly loaded, then a moderate to low back off window may be sufficient to avoid collisions. The maximum backoff window size could be also related with the packet delay budget defined by QoS. For example, the maximum backoff window size of a random access procedure initiated for a voice packet should be smaller than the maximum backoff window size of a random access procedure initiated for a best effort packet. Moreover, the power and backoff window are determined such that a scaled product of the power and backoff window meets a desired retransmission success rate. FIGS. 4A-4C show the scaled product in further detail. Generally, the backoff window may be adjusted by a scaling factor, thus the scaled product may include a product of the retransmission power and the scaled backoff window. Other methods of determining a scaled product may be apparent to those having ordinary skill in the art in light of this disclosure. In other words, step 302 defines a function for determining the power and backoff window appropriate for a QoS of the wireless device using the distance from the access node and a scaling factor associated with the cell load.

At 303, the retransmission parameters (i.e. power and backoff window) are compared with constraints for the access node. The constraints may be defined based on the cell load of the access node, or other characteristics of the access node. For instance, as shown in FIGS. 4B-4C, maximum constraints on the power level and the backoff window may be defined, and the parameters adjusted to meet both the maximum constraints and the desired success rate. The parameters may therefore be adjusted at 304, prior to being transmitted to the wireless device. For instance, the retransmission power can be provided to the wireless device in a powerRampingStep portion of a SIB2 message, and the backoff window may be provided as a backoff indicator (BI) parameter within a special MAC subheader.

FIGS. 4A-4C depict graphs of exemplary retransmission parameters for a contention-based random access request. As described herein, operations are performed that target a desired random access probability of success based on the QoS of the wireless device. The vertical axis 401 represents the retransmission power and the horizontal axis 402 represents the backoff window size/time. The backoff window size may be scaled by a scaling factor based on the current PRACH cell load. A two-dimensional area calculation of a selected power level 401 and backoff window size 402 may be equated with a particular success rate. For example, with reference to FIG. 4A, scaled product 406 comprises a selected power level and backoff window size that equates to a 100% probability of success. In an embodiment, scaled product 406 may comprise a product of a maximum allowable power level and backoff window size for a particular congestion level of an access node. Further, scaled product 405 comprises a product of a power level and backoff window size that equates to a 50% probability of success. Generally, depending on the QoS of the wireless device, any desired probability of success between 50% and 100% may be defined, and parameters adjusted accordingly. It should be noted that the scaled product does not linearly correspond to the probability of success, but instead is an approximation of the probability of success. Consequently, various scaling factors and product calculations may be used, so long as they generally represent a probability of success for retransmissions from the wireless device.

Moreover, the product may be not necessarily be represented as a square, as depicted in FIG. 4A. For instance, referring to FIGS. 4B and 4C, either the power level or the backoff window size may be adjusted to satisfy a maximum threshold, so long as the area of the two-dimensional depiction is approximately equivalent to the desired probability of success. With reference to FIG. 4B, scaled products 405 and 410 correspond to the same retransmission success rate. However, scaled product 410 comprises a power level that is increased until it reaches a maximum power level 420, upon which it cannot go any higher. Such parameter selection may be useful, for instance, for a wireless device that is a long distance away from the access node, thereby requiring a higher power level 401 for retransmission, and is able to use a smaller backoff window size 402 while maintaining a desired success rate. In this case, the maximum power level 420 may be defined based on, for instance, a cell load of the PRACH channel. Further with reference to FIG. 4C, scaled products 405 and 411 correspond to the same retransmission success rate. However, scaled product 411 comprises a backoff window size that is increased until it reaches a maximum backoff window size 421, upon which it cannot take any longer. The power level 401 is correspondingly lowered so as to maintain the desired level of success without using excessive power. Such parameter selection may be useful, for instance, for a wireless device that is relatively close to access node, but where the PRACH channel is congested, thereby requiring a larger backoff window size while maintaining a desired success rate. The maximum backoff window size 421 may be defined based on, for instance, a cell load of the PRACH channel, as well as the packet delay budget defined by QoS. Generally, any combination of power and back-off window size may be determined subject to constraints 420, 421, so long as the scaled product is equivalent to the desired retransmission success rate.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 210, wireless devices 120, 130, and/or network 101.

Figure 5:
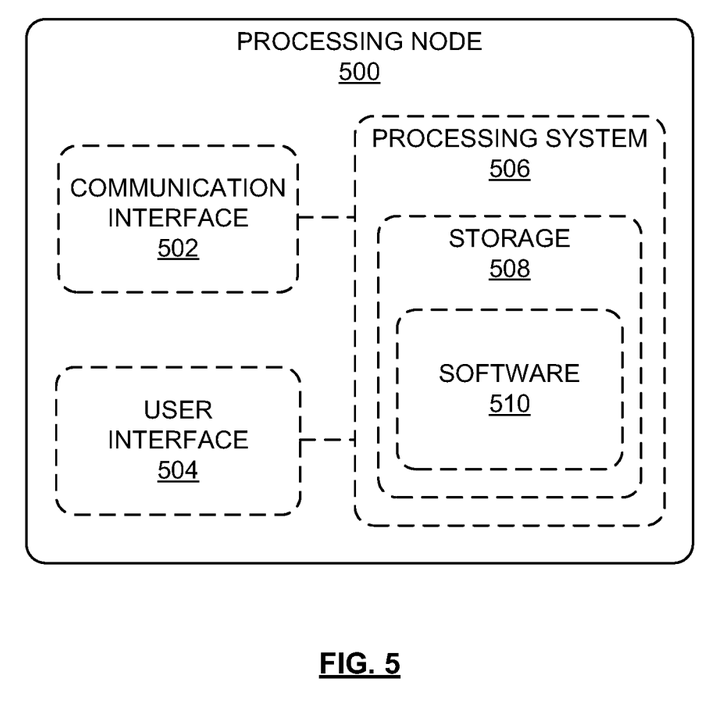
FIG. 5 depicts an exemplary processing node.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a retransmission parameter determination module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for random access in a wireless network, the method comprising:
   determining a retransmission power and a backoff window for a retransmission of a connection request to an access node from at least one of two or more wireless devices;
   comparing a scaled product of the retransmission power and backoff window with a predefined retransmission success rate;
   determining that the scaled product is lower than the predefined retransmission success rate; and
   increasing one or both of the retransmission power and the backoff window prior to transmitting the retransmission power and backoff window to the at least one of said two or more wireless devices.

2. The method of claim 1, wherein determining the retransmission power and backoff window is triggered by a collision between connection requests from the two or more wireless devices.

3. The method of claim 1, wherein the retransmission power and the backoff window are subject to one or more maximum constraints based on a cell load of the access node.

4. The method of claim 1, wherein the predefined retransmission success rate is based on a quality of service (QoS) associated with the at least one of said two or more wireless devices.

5. The method of claim 1, wherein determining the retransmission power is based on a distance between the access node and the at least one of the two or more wireless devices.

6. The method of claim 1, wherein determining the backoff window is based on one or more of a cell load of the access node and a packet delay budget based on a quality of service (QoS) associated with the at least one of said two or more wireless devices.

7. The method of claim 6, further comprising determining the scaled product using a scaling factor for the backoff window, the scaling factor being based on the cell load.

8. The method of claim 1, further comprising:
   determining that the scaled product is substantially higher than the predefined transmission success rate, and
   decreasing one or both of the retransmission power and the backoff window.

9. A system for random access in a wireless network, the system comprising:
   an access node for providing network services to one or more wireless devices; and a processor communicatively coupled to the access node, the processor for configuring the access node to perform operations comprising:

obtaining a location and a quality of service (QoS) of a wireless device that lost a contention-based random access procedure;

based on the location, the QoS, and a cell load of the access node, determining a retransmission power and a backoff parameter for the wireless device, wherein a scaled product of the retransmission power and the backoff parameter represents a success rate for a subsequent preamble transmitted by the wireless device;

determining that the scaled product is lower than a threshold success rate;

increasing one or both of the retransmission power and the backoff window until the scaled product meets the threshold success rate; and upon determining that the scaled product meets the threshold success rate, transmitting the retransmission power and the backoff parameter to the wireless device.

10. The system of claim 9, wherein the operations further comprise determining the threshold success rate based on the QoS.

11. The system of claim 9, wherein the cell load comprises a cell load of a physical random access channel (PRACH) of the access node.

12. The system of claim 11, wherein the operations further comprise determining a maximum retransmission power based on the cell load.

13. The system of claim 9, wherein the operations further comprise transmitting the retransmission power to the wireless device via a system information block (SIB) message.

14. The system of claim 9, wherein the operations further comprise transmitting the backoff parameter to the wireless device via a backoff indicator message.

15. A processing node for random access in a wireless network, the processing node comprising a processor for enabling the processing node to perform operations comprising:

determining a retransmission power and a backoff window for a preamble transmitted by a wireless device to an access node;

scaling the backoff window based on a cell load of the access node;

comparing a product of the retransmission power and the scaled backoff window with a predefined threshold;

determining that the product is lower than the predefined threshold; and increasing one or both of the retransmission power and the backoff window, wherein the predefined threshold represents a probability of success of the preamble reaching the access node.

16. The processing node of claim 15, wherein the operations further comprise determining that the product is higher than the predefined threshold, and decreasing one or both of the retransmission power and the backoff window.

17. The processing node of claim 15, wherein the increasing is performed subject to one or more constraints based on the cell load of the access node.

* * * * *